United States Patent [19]

Pan

[11] 4,355,706
[45] Oct. 26, 1982

[54] BICYCLE REAR BRAKE MOUNTED WITH SPROCKET WHEEL

[76] Inventor: Sheang Y. Pan, 5, Alley 146, Lane 114, Yen Huan E. Rd., Fong Yuan, Taiwan

[21] Appl. No.: 198,758

[22] Filed: Oct. 20, 1980

[51] Int. Cl.³ .................. B62L 3/02; F16D 55/16
[52] U.S. Cl. .................. 188/24.11; 192/6 R; 280/259; 280/264
[58] Field of Search .......... 280/259, 264, 261; 188/26, 24.11, 72.8, 73.2; 192/5, 6 R

[56] References Cited

U.S. PATENT DOCUMENTS

| | | | |
|---|---|---|---|
| 483,621 | 10/1892 | Reaney | 188/26 |
| 683,779 | 10/1901 | Lund | 192/6 R |
| 2,530,764 | 11/1950 | Gleasman | 192/6 R |
| 3,203,519 | 8/1965 | Schwerdhöfer | 192/6 R |
| 3,892,301 | 7/1975 | Frei et al. | 188/26 |
| 4,182,194 | 1/1980 | Tomozawa | 188/26 |

FOREIGN PATENT DOCUMENTS

| | | | |
|---|---|---|---|
| 363093 | 2/1906 | France | 188/26 |
| 11566 | of 1902 | United Kingdom | 188/26 |
| 531275 | 1/1941 | United Kingdom | 188/26 |

*Primary Examiner*—David M. Mitchell
*Assistant Examiner*—Donn McGiehan

[57] ABSTRACT

A cable operated rear bicycle brake mounted with a sprocket wheel wherein a ratchet and pawl mechanism is provided between a hub barrel and the sprocket wheel, the rotation of the hub barrel being effected by the direction of the rotation of the sprocket wheel. Instead of an internal shoe brake mechanism, the rear brake utilizes a disc brake mechanism provided between the hub barrel and a brake cone member to brake a bicycle efficiently.

2 Claims, 3 Drawing Figures

BICYCLE REAR BRAKE MOUNTED WITH SPROCKET WHEEL

BACKGROUND OF THE INVENTION

The present invention relates to a bicycle rear brake mounted with a sprocket wheel, and in particular to a bicycle rear brake which is preferably operated by hand.

Traditionally, an internal shoe brake utilized in a bicycle rear hub is activated by pressing the lined shoe thereof against the inner surface of an end portion of the hub barrel. Although this type of brake is protected from the disadvantageous effects of water and grit, it still exhibits certain disadvantages. Firstly, due to the inherent restriction of the shoe brake, the arc-shaped shoe which is lined with friction material can not extend over the whole inner surface of an end portion of the hub barrel, thus, complete exertion of the friction force on the inner surface of the hub barrel can not be achieved. Secondly, when the friction lining of the brake shoe is worn out, the entire shoe must be replaced. Thirdly, the hub barrel and the sprocket wheel must be separately mounted on an axle thereof, and hence a further driving member must be added thereto for coupling the barrel and the sprocket wheel to drive the hub barrel.

SUMMARY OF THE INVENTION

In accordance with the present invention a bicycle rear brake mounted with a sprocket wheel comprises:

a hub barrel member defining a first axial hole therein said hub barrel having a narrow central neck portion and two wider end portions, said first end portion thereof being provided with a first larger space which communicates axially with the outside and the first axial hole defined by the hub barrel, said first portion having an inner surface which slopes slightly in the axial direction to form a cone-shaped space, a first bearing surface whose axis corresponds with the longitudinal axis of the hub barrel, said surface being located between the cone-shaped space and the neck portion, said second end portion of the hub barrel defining a second larger space which communicates axially with the outside and the axial hole defined in the hub barrel; a second bearing surface whose axis is in alignment with that of the longitudinal axis of the hub barrel, said second bearing surface being provided between said second larger space and the neck portion said second end portion having a threaded outer end surface and defining an annular groove, said annular groove being located between the neck portion of the hub barrel, and said end portion and a slot located on said second portion, said slot intersecting said first annular groove;

a pawl member having a second groove thereon corresponding to the first annular groove, the bottom of the pawl member being rotatably inserted in the slot by fixing a ring spring around the first annular groove and the second groove, the pawl member being so sustained that the pointed end of the pawl member may protrude out of the first annular groove;

a sprocket wheel having an inner annular surface thereof provided with ratchet which cooperates with the pawl member so that the sprocket wheel can drive or release the hub barrel;

means for hindering the movement of the sprocket wheel along the axial direction of the hub barrel;

an axle having two threaded end portions;

a first bearing cap member defining a second axial hole therein, the inner surface of the first bearing cap member being threaded so that the first bearing cap member can be threadably engaged with the axle and cooperate with the second bearing surface to form a first race;

a second bearing cap member defining a third axial hole therein, an end portion thereof being provided with a pocket, the outer surface of the other end portion thereof being threaded, the central portion thereof being provided with a block, the inner surface of the second bearing cap member being threaded so that the second bearing cap member can be threadably engaged with the axle and the pocket thereof can cooperate with the first bearing surface to form a second ball race;

a spring stop member defining an opening therein, said opening having a shape corresponding to the block so that the block can hinder the spring stop member from rotating around the axle;

a brake cone member defining an axial opening therein said opening having a shape corresponding to the block so that the block can hinder the brake cone member from rotating around the axle, and a spring holder being provided therein for holding a spring so that as the brake cone member is pressed against the cone-shaped space of the hub barrel, the spring is pushed against the spring stopping member until the pressure on the brake cone member is released at which time the spring urges the brake member back to its original position;

a brake cone driving member defining an axial hole, the inner surface thereof being threaded for engagement with the second bearing cup press against the brake cone member; and a brake arm member which can move the brake cone driving member back and forth along the axle.

It is a primary object of the present invention to directly combine the rear brake and the sprocket wheel, whereby the sprocket wheel is directly mounted on the hub barrel without any coupling member for power transmission.

It is an another object of the present invention to provide a rear hand brake, in which a disc brake mechanism is used rather than an internal shoe mechanism. A disc brake utilizes an enlarged braking area and therefore provides a better braking effect can be attained.

It is a further object of the present invention to provide a rear brake which may be easily replaced.

These and other objects will be more apparent by describing a preferred embodiment with reference to the following drawings, in which:

DETAILED DESCRIPTION OF THE PREFERRED EMBODIMENT

Figure 1:
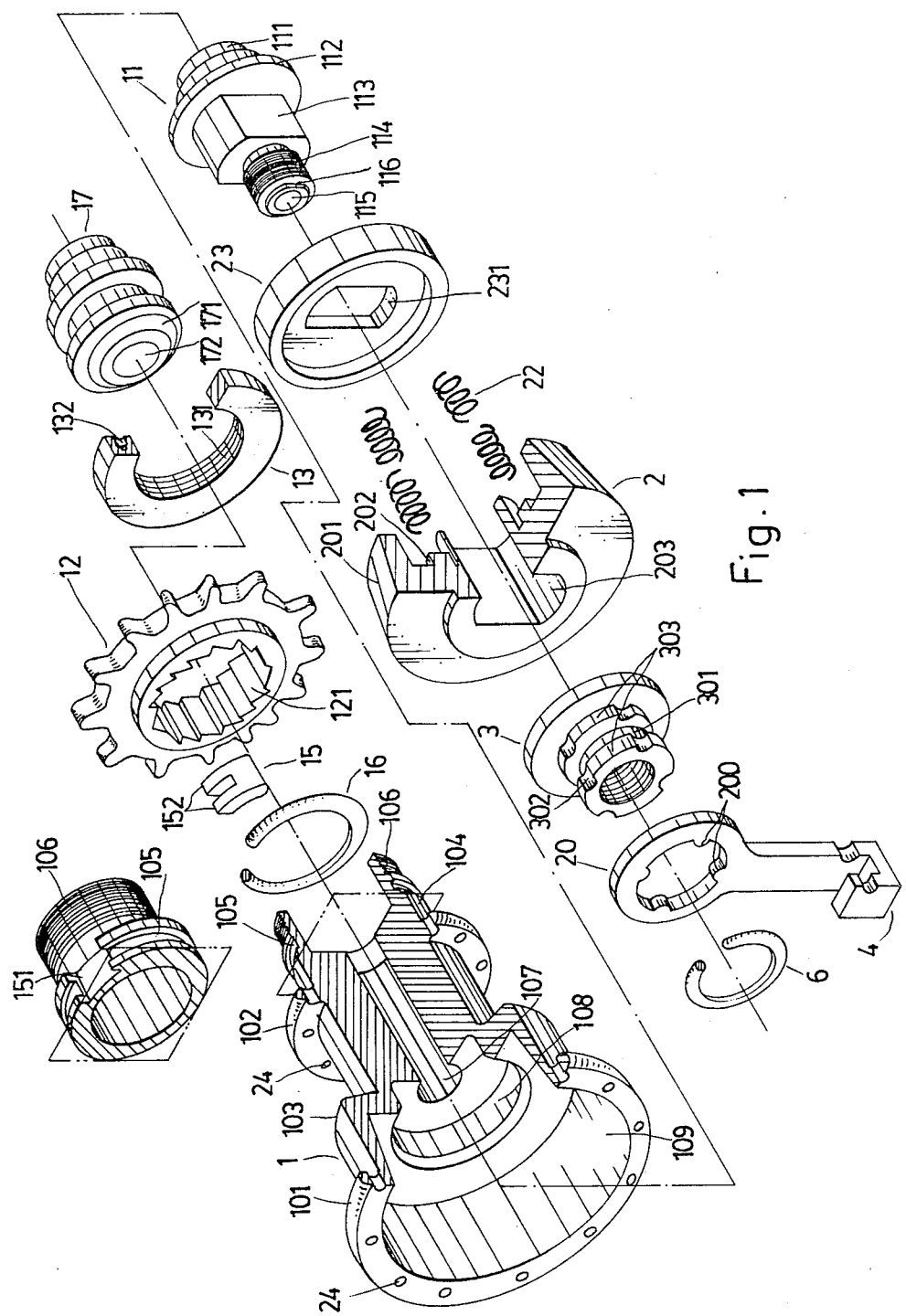
FIG. 1 is an exploded perspective and partly sectional view, of the brake according to the present invention.
Figure 2:
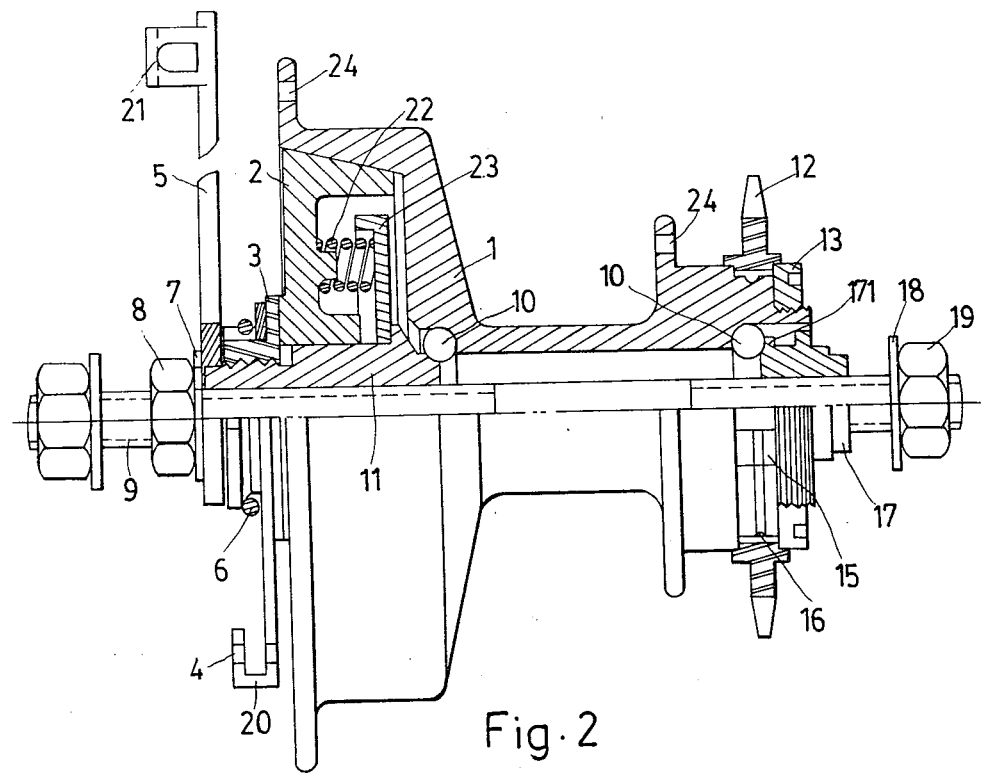
FIG. 2 is a partial sectional view of the brake.
Figure 3:
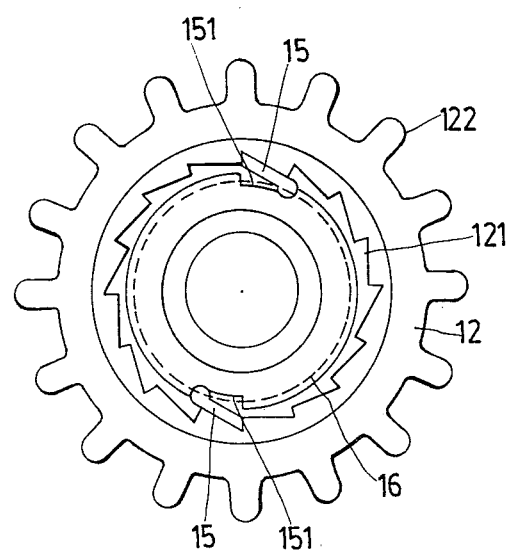
FIG. 3 is a sectional schematic view illustrating the ratchet and pawl mechanism provided between the hub barrel and the sprocket wheel thereof.

As shown in the drawings, a hollow hub barrel 1 has a narrow central neck portion and two wider end portions 103, 104. Provided on the end portions of the hub barrel 1 are flange 101 and a flange 102. Flanges 101, 102 define a plurality of holes 24 for fixing a number of spokes (not shown) on the hub barrel 1. The outer surface 106 of the end portion 104 is threaded for to engage with a sprocket wheel fixing member 13 to prevent a sprocket wheel member 12 from sliding upon the axis of the hub barrel 1. Provided next to the threaded outer surface 106 of the end portion 104 is an annularly grooved member 105. A slot 151 intersects with said groove 105 for receiving a pawl member 15. Axel 9 extends through bearing cap members 11 and 17 passing alongside balls 10 into and through the inner diameter of the hub barrel 1 such that the hub barrel 1 can freely revolve around the axle 9.

The axle 9 which passes through an axial hole 107 of the hub barrel 1, has two end portions each of which is threaded on its outer surface. The first of said threaded portions is rotated through first, bearing cap member 11, second, a washer 7 and third a lock nut 8. The other threaded end portion of axle 9 similarly engages first with bearing cap member 17, second with a washer 18 and third with a lock nut 19.

The bearing cap member 11 defines along its longitudinal axis an annular opening 115. A first end portion of the bearing cap member 11 defines an annular pocket 111 for receiving balls 10. Balls 10, lying mediate bearing surface 108 and the annular pocket 111, enable the hub barrel 1 revolve freely around the axle 9. A flange 112 of the bearing cap member 11 is disk shaped for blocking a spring stop member 23. A block 113 is provided on the bearing cap member 11 for hindering the spring stop member 23 and a brake cone member 2 from rotating around the axle 9. The outer surface 114 of a second end portion of the bearing cap member 11 is threaded to engage with brake cone driving member 3. A small block 116 provided on the bearing cap member 11 is engaged with a corresponding sleeve (not shown in the drawings) which is provided at a first end of a fixing arm 5. On a second end of the fixing arm 5 is provided a ring 21 which is to be attached to the bicycle frame (not shown). The bearing cap member 11 is hindered from rotating around the axle 9 by the engagement brake cone driving member 3 with the threaded outer surface 114. Fixing arm 5 is pressed against the bearing cap member 11 one its one side by the washer 7 and the lock nut 8 both washer 7 and lock nut 8 being threaded into engagement with the axle 9.

Located proximate the second side of the fixing arm 5 and along the longitudinal length of the axle 9 are a series of braking elements, i.e. said brake cone driving member 3, brake cone member 2 and spring stop member 23. The brake cone driving member 3 defines an axial opening along its longitudinal axis which engages with threaded outer surface 114 of the bearing cap member 11. On the outer surface of the brake cone driving member 3 are two identical parallel flanges 303 which define annular opening 301. Defined in the separate rims of both flanges 303 are four recesses 302 which engage with corresponding protrusions 200 provided on the inner surface of the ring portion of a brake arm 20. By placing a spring ring 6 around annular opening 301, the brake arm 20 can be fixed at one end of the brake cone driving member 3 such that the protrusions 200 engage with the corresponding recesses 302. At the non-ringed end of the brake arm 20 is provided a hook-shaped seat 4 which connects with a hand brake by means of a transmission cable (not shown). As the hook-shaped seat 4 is moved, the brake cone driving member 3 will be forced to rotate causing the brake cone member 2 to move against the inner surface 109 of the wider end portion 103 of the hub barrel 1.

The brake cone member 2 defines an oblong-shaped axial sleeve 203 which fits correspondingly over the block 113 so that the brake cone member 2 may be guided to move along the axle 9. Four protrusions 202 are provided on the brake cone member 2 around the sleeve 203, to act as the seats for four springs 22. The degree of inclination of the rim 201 is determined by that of the inner surface 109 of the wider end portion 103.

The spring stop member 23 is disc-shaped and defines at its axis a hole 231 which is similar in shape to sleeve 203 of the brake cone member 2 such that it too fits over the block 113.

The bearing cap member 17 bounds an opening along its longitudinal length which opening threads onto axle 9. Balls 10 which lie mediate the bearing surface 108 provided on the end portion 103 of the hub barrel 1 and face 171 of the bearing cap member 17, enable the hub barrel 1 to revolve freely around the axle 9.

The sprocket wheel 12 mounted around the annular groove 105 provided on the outer surface of the wider end portion 104 of the hub barrel 1 is held in place by the sprocket wheel fixing member 13. The inner circumference of the sprocket wheel 12 is provided with a serration 121 for cooperating with said pawl member 15 which is received in the slot 151 to act as a ratchet mechanism so that the sprocket wheel 12 imparts forward movement to the hub barrel 1 as the sprocket wheel 12 turns forward, and releases the hub barrel as the sprocket wheel 12 turns backward.

The sprocket wheel fixing member 13 is hollow, the inner circumference 131 thereof being threaded, and on one side thereof two holes 132 are defined. Said holes being diametrically symmetrical to each other so that the sprocket wheel fixing member 13 can cooperate with the threaded end portion 104 of the hub barrel 1 to tightly fit with it.

The pawl member 15 is U-shaped, its bottom portion being situated in the slot 151 and being fixed thereto by placing a spring ring 16 around the annular groove 105 so that the pronged ends 152 of pawl member 15 may not pivot out of alignment such that they intersect groove 115.

As the sprocket wheel 12 moves forward, the hub barrel 1 is correspondingly revolved around the axle 9 through the interaction of the pawl member 15 with serration 121. When the brake arm 20 is actuated, the brake cone driving member 3 is rotated and the brake cone 2 is pushed against the braking surface 109 of the wider end portion 103, preventing the hub barrel 1 from revolving. As the brake arm 20 is released, the brake cone member 2, is no longer pressed against braking surface 109 and the spring 22 biases the brake cone member 2 back to its original position allowing its hub barrel 1 to resume its forward movement through the interaction of pawl member 15 with serration 121.

With the invention thus explained, it is apparent that obvious variations and modifications can be made within the spirit of this invention. It is intended that the scope of the invention be defined by the appended claims.

What I claim is:
1. A bicycle rear brake mounted with a sprocket wheel comprising:
 a hub barrel member defining a first axial hole therein, said barrel having a narrower central neck portion and two wider end portions, a first end portion of the two end portions being provided with a first larger space which communicates axially with the outside and said first axial hole, the inner surface of the first portion slightly sloping in the axial direction to form a cone-shaped space, located between the cone-shaped space and the neck portion being a first bearing surface which has its axis aligned with that of said first axial hole; a second end portion of the two end portions being provided with a second larger space which communicates axially with the outside and said first axial hole, provided between the second larger space and the neck portion being a second bearing surface which has its axis aligned with that of said first axial hole, the outer surface of said second end portion being threaded, and defining a first annular groove and a slot, said annular groove being located between said neck portion and said threaded end, said slot intersecting said first annular groove;

a pawl member having a second groove thereon corresponding to the first annular groove, the bottom of the pawl member being rotatably inserted in the slot by fixing a ring spring around the first annular groove and the second groove, the pawl member being so sustained that the pointed end of the pawl member may protrude out of the periphery of the first annular groove;

a sprocket wheel having an inner annular surface thereof provided with a ratchet which cooperates with the pawl member so that the sprocket wheel can drive or release the hub barrel;

means for hindering the movement of the sprocket wheel along the axial direction of the hub barrel;

an axle having two threaded end portions;

a first bearing cap member defining a second axial opening therein, the inner surface of the first bearing cap member being threaded so that the first bearing cap member can be threadably engaged to the axle and cooperate with the second bearing surface to form a first ball race;

a second bearing cap member defining a third axial opening therein, an end portion thereof being provided with a pocket, the outer surface of the other end portion thereof being threaded, the central portion thereof being provided with a block, the inner surface of the second bearing cap member being threaded so that the second bearing cap member can be threadably engaged with the axle and the pocket thereof can cooperate with the first bearing surface to form a second ball race;

a spring stop member defining an opening therein whose shape corresponds to the block so that the block can hinder the spring stop member from rotating around the axle;

a brake cone member defining an axial opening therein, said opening having a shape corresponding to the block so that the block can hinder the brake cone member from rotating around the axle, and a spring holder being provided therein for holding a spring so that as the brake cone member is pressed against the cone-shaped space of the hub barrel the spring is compressed against the spring stop member, such that upon release of the pressure, the brake cone member is returned to its original position, by the return force of the compressed spring;

a brake cone driving member defining an axial hole, the inner surface thereof being threaded for engagement with the second bearing cap to press against the brake cone member; and a brake arm member which can move the brake cone driving member back and forth along the axle.

2. A bicycle rear brake mounted with a sprocket wheel according to claim 1, wherein the outer surface of the brake cone driving member is provided with a flange on whose rim is defined a plurality of recesses, the brake arm member having a corresponding plurality of protrusions on the inner circumference thereof for engagement with the recesses of the brake cone driving member to drive the brake cone driving member back and forth along the axle.

* * * * *